(12) United States Patent
Jin (10) Patent No.: US 11,341,678 B2
(45) Date of Patent: May 24, 2022

(54) DEVICE AND METHOD FOR CALCULATING A VEHICLE TRAILER POSE USING A CAMERA

(71) Applicant: CONTINENTAL AUTOMOTIVE GMBH, Hannover (DE)

(72) Inventor: Yonggang Jin, Shanghai (CN)

(73) Assignee: Continental Automotive GmbH, Munich (DE)

( * ) Notice: Subject to any disclaimer, the term of this patent is extended or adjusted under 35 U.S.C. 154(b) by 0 days.

(21) Appl. No.: 17/014,147

(22) Filed: Sep. 8, 2020

(65) Prior Publication Data

US 2020/0402257 A1 Dec. 24, 2020

Related U.S. Application Data

(63) Continuation of application No. PCT/EP2019/054695, filed on Feb. 26, 2016.

(30) Foreign Application Priority Data

Mar. 9, 2018 (EP) ..................................... 18160840

(51) Int. Cl.
 *G06T 7/73* (2017.01)
 *H04N 5/225* (2006.01)
(52) U.S. Cl.
 CPC ............. *G06T 7/74* (2017.01); *H04N 5/2253* (2013.01); *G06T 2207/30252* (2013.01)
(58) Field of Classification Search
 CPC ... G06T 7/74; G06T 2207/30252; G06T 7/73; H04N 5/2253
 See application file for complete search history.

(56) References Cited

U.S. PATENT DOCUMENTS

| 10,532,698 B2 * | 1/2020 | Potnis ..................... G06N 3/08 |
| 10,706,291 B2 * | 7/2020 | Diessner ............. H04N 5/2253 |

(Continued)

FOREIGN PATENT DOCUMENTS

| DE | 102008045436 A1 * | 3/2010 | ............... B60D 1/30 |
| DE | 102008045436 A1 | 3/2010 | |

(Continued)

OTHER PUBLICATIONS

Zhou et al. "Velocity Estimator via Fusing Inertial Measurements and Multiple Feature Correspondences from a Single Camera", Proceedings of the IEEE, International Conference on Robotics and Biomimetics (ROBIO), Shenzhen, China, Dec. 2013. (Year: 2013).*

(Continued)

*Primary Examiner* — Richard A Hansell, Jr.

(57) ABSTRACT

A device for calculating a vehicle trailer pose using a camera is disclosed, including: a camera arranged offset from a tow bar position of the vehicle and configured to capture an image of the trailer; a memory which is configured to provide data at least one intrinsic parameter of the camera; at least one extrinsic parameter of the camera; at least one predefined tow bar position; and a first image from the camera showing the vehicle trailer at a first pose wherein the camera captures a second image showing the trailer at a pose to be determined; a processor configured to provide image analysis and determine at least one feature correspondence between the first image and the second image and calculate a change in the trailer pose between a first pose of the first image and a second pose of the second image based on the determined correspondence.

13 Claims, 8 Drawing Sheets

(56) References Cited

U.S. PATENT DOCUMENTS

| | | | | |
|---|---|---|---|---|
| 10,733,757 B2* | 8/2020 | Gupta | ..................... | B60D 1/245 |
| 10,863,335 B2* | 12/2020 | Koravadi | ................. | H04W 4/80 |
| 10,885,652 B2* | 1/2021 | Gupta | ..................... | B62D 13/06 |
| 2016/0059888 A1* | 3/2016 | Bradley | ..................... | B60T 7/22 |
| | | | | 701/41 |
| 2017/0174128 A1 | 6/2017 | Hu et al. | | |
| 2018/0276839 A1* | 9/2018 | Diessner | ................... | B60R 1/00 |
| 2018/0365509 A1* | 12/2018 | Naserian | .............. | G06K 9/3233 |

FOREIGN PATENT DOCUMENTS

| | | | | |
|---|---|---|---|---|
| DE | 102011113197 A1 * | 3/2013 | ......... | G06K 9/00791 |
| DE | 102011113197 A1 | 3/2013 | | |

OTHER PUBLICATIONS

International Search Report and Written Opinion dated Apr. 8, 2019 from corresponding International Patent Application No. PCT/EP2019/054695.

European Search Report dated Jun. 25, 2019 for corresponding European Patent Application No. 18160840.7.

Owens Robyn, "Epipolar Geometry" Oct. 29, 1997, XP055807028, found at https://homepages.inf.ed.ac.uk/rbf/CVonline/LOCAL_COPIES/Owens/LECT10/node3.html.

Examination Report (Communication Pursuant to Article 94(3) EPC), dated Jun. 1, 2021, for counterpart EP patent application 18 160 840.7.

* cited by examiner

DEVICE AND METHOD FOR CALCULATING A VEHICLE TRAILER POSE USING A CAMERA

CROSS-REFERENCE TO RELATED APPLICATIONS

This application claims priority to PCT Application PCT/EP2019/054695, filed Feb. 26, 2019, which claims priority to European Application EP 18160840.7, filed Mar. 9, 2018. The disclosures of the above applications are incorporated herein by reference.

FIELD OF THE INVENTION

The present invention relates to the field of location and position awareness, according to which devices can passively or actively determine absolute or relative locations and positions for vessels and vehicles. Particularly, the present invention relates to a device and a method for calculating an absolute or relative change in vehicle trailer pose using a camera.

BACKGROUND OF THE INVENTION

Trailer angles can be calculated by a variety of methods, such as a mechanical hitch angle detector, such as a potentiometer or other device in the trailer hitch, sonar, IMU sensors, inertial measurement unit, e.g. accelerometer, compass etc., or computer vision system tracking features on the trailer.

With a computer vision system, methods usually work by calculating an essential matrix, from which the rotation and translation of the camera relative to the trailer can be calculated or determined. The essential matrix is often determined by an 8-point algorithm, which uses 8 feature correspondences to calculate the 3×3 Essential Matrix.

SUMMARY OF THE INVENTION

There may be a need to improve the calculating of a vehicle trailer pose.

These needs are met by the subject-matter of the independent claims. Further exemplary embodiments are evident from the dependent claims and the following description.

An aspect of the present invention relates to a device for calculating a vehicle trailer pose using a camera, the device comprising: a camera which is arranged offset from a tow bar position of the vehicle and which is configured to capture an image of the trailer.

The device further comprises a memory which is configured to provide data i) at least one intrinsic parameter of the camera; ii) at least one extrinsic parameter of the camera; iii) at least one predefined tow bar position; iv) an first image taken from the camera showing the vehicle trailer at a first pose wherein the camera is configured to capture a second image showing the trailer at a pose to be determined.

Further, the device comprises a processor which is configured to provide image analysis and determine at least one feature correspondence between the first image and the second image and calculate a change in the trailer pose between a first pose of the first image and a second pose of the second image based on the determined correspondence.

In other words, the present invention advantageously provides a specific algorithm that is presently aimed at calculating a trailer angle using feature correspondences from a camera image and a calibrated camera and tow bar position.

Alternatively, the present invention could be extended to also estimate the intrinsic and extrinsic parameters, and the tow ball position. For example, the algorithm could minimize either a corresponding error metric, such as Sampson distance, Algebraic distance or reprojection error, by varying the rotation, intrinsic, extrinsic and/or tow bar position. This could be combined with the 2- or 3-point method described later to refine the rotation estimate.

Existing camera based methods may use other techniques such as Structure From Motion (SFM) or Simultaneous Localization and Mapping (SLAM) based approaches.

These existing techniques are subject to multiple errors, as they do not take advantage of the constrained nature of the movement of a trailer attached to a vehicle, which results in reduced number of degrees of freedom. In particular, the constraint as used by the present invention is that the rotation is fixed at the tow bar.

The present invention advantageously provides a set of algorithms in order to solve the problem of estimating the yaw, pitch and optionally roll of the trailer angle using a minimum of for example 2 or 3 feature correspondences in a pair of images.

The algorithm requires:
i.) A camera with known intrinsics and extrinsics, mounted on the rear of a vehicle, facing the rear. The camera must be offset from the tow bar position.
ii.) A known tow bar position
iii.) A known Reference Image, showing the trailer at the predetermined position or a previous image showing the trailer at a previous unknown rotation.
iv.) A current—second—image showing the trailer at an unknown rotation
v.) A set of feature correspondences on the image, between the reference—first—image and the current image.

The terms "intrinsics and/or extrinsics" as used by the present patent application may refer to any intrinsic or extrinsic camera parameter, e.g. parameters of camera model. Intrinsic parameters may be for instance focal length, image sensor format, and principal point.

The term "extrinsics" may refer to extrinsic parameters, which for instance denote the coordinate system transformations from 3D world coordinates to 3D camera coordinates.

The reference image shows the trailer pose at a known position. This position may show the trailer with zero pitch, roll and yaw relative to the vehicles longitudinal axis (i.e. the trailers positon if the vehicle is driving in a straight line).

Alternatively, more than one Reference Image could be used. For example two reference images could be used, one with the trailer yaw at 45 degrees, and one with the trailer yaw at −45 degrees. The system could choose the Reference Image that maximizes the distances between the feature correspondences on the current image and the feature correspondences on the reference image. By maximizing these distances, the system may improve accuracy by providing a greater baseline for triangulation.

Alternatively, the algorithm could be used with a current image of a trailer at a current rotation, and a previous image of the trailer at a previous rotation. The algorithm could then calculate the relative change in pose between the previous and current images.

The algorithm could be extended to triangulate the 3d positions of the points on the trailer represented by the feature correspondences to build a 3d point cloud of the trailer. An estimate of the trailers absolute rotation could then be made by calculating the angles from the tow bar to each of the 3d points in the point cloud of the trailer. For example, the median of these angles could be used as an estimate of the trailers rotation. In this way, an estimate of the trailers absolute rotation could be made without a Reference Image showing the trailer at a known rotation.

The present invention advantageously provides that for instance by using only 2 or 3 feature correspondences, the RANSAC process is much quicker to converge.

The algorithm is more accurate and provides smoother results over time compared to alternative methods, when dealing with errors in the feature correspondences.

The present invention advantageously provides that potentially the device and the method could be adapted to work with HGV or double articulated trailers. The trailer pose estimation algorithm is designed to calculate the pose—for instance as defined by yaw, pitch and optionally roll—of a trailer behind a vehicle.

The present invention advantageously uses feature correspondences from two images of the trailer obtained from for instance a rear facing camera.

Given a set of feature correspondences between features in a current image and a previous image, the algorithm can estimate the relative change in pose of the trailer between the previous image and the current image.

Given a set of feature correspondences between features in a current image in which the trailer has unknown rotation and features in a Reference Image in which the trailer has a known rotation, the algorithm can estimate the pose of the trailer in the current frame.

The intrinsic/extrinsic calibration of the camera and the tow hitch position are known in advance.

Compared to a general method of determining pose, the 2 and 3 point solvers exploit the constrained movement of a vehicle trailer that occurs because the rotation happens at the tow ball position Therefore, the rotation and translation observed by the camera are not independent because the relative translation of the trailer with respect to the camera, depends on the yaw, pitch and roll of the trailer. This eliminates solutions that are not physically possible which leads to more accurate estimates. More accurate as used by the present invention in this context refers to how the accuracy of the pose estimates, and the variance of the pose estimates over time.

This is possible because the center of rotation (the tow bar) is offset from the camera which observes the rotation. This means that trailer appears to undergo translation from the point-of-view of the camera.

The 2-point algorithm adds one more constraint, for instance that roll is assumed to be zero. This optionally further reduces computational loads and leads to estimates with less variance but might be less accurate.

Similarly, a 1-point algorithm could be used which would, for instance, assume both roll and pitch are zero.

The 1-, 2- and 3-point methods are also faster and converge more quickly than general camera pose methods, which may require up to 8 points, when used with iterative methods such as RANSAC. This is because there are fewer permutations of feature correspondences to test, and therefore less likelihood of including an incorrect feature correspondence in each tested permutation.

The abbreviation RANSAC refers to Random sample consensus which is an iterative method to estimate parameters of a mathematical model from a set of observed data that contains outliers, when outliers are to be accorded no influence on the values of the estimates.

A further, second aspect of the present invention relates to a method for calculating a vehicle trailer pose using a camera, the method comprising the following steps of:

As a first step, providing a camera which is arranged offset from a tow bar position of the vehicle, which is configured to capture an image of the trailer is performed.

A further, second step of the method of the second aspect of the present invention refers to providing, by means of a memory, data on:
  i) at least one intrinsic parameter of the camera;
  ii) at least one extrinsic parameter of the camera;
  iii) at least one predefined tow bar position;
  iv) an first image taken from the camera showing the vehicle trailer at a first pose representing the vehicle trailer at a predefined position;

A further, third step of the method of the second aspect of the present invention refers to a second—current—image showing the trailer at a second pose by means of the camera.

A further, fourth step of the method of the second aspect of the present invention refers to image analysis and determining a feature correspondence between the first image and the second image and calculating a change in the trailer pose between the first pose and the second pose based on the determined correspondence by means of a processor.

In other words, the fourth step refers to providing image analysis and determining a feature correspondence between the first image and the second image and calculating a change in the trailer pose between a first pose of the first image and a second pose of the second image based on the determined correspondence.

If only one feature correspondence is used two rotation parameters are assumed to be zero. For instance, the algorithm could solve for yaw only, and pitch and roll could be assumed to be zero.

According to an exemplary embodiment of the present invention, the trailer pose is determined based on the Epipolar constraint.

According to an exemplary embodiment of the present invention, the trailer pose is determined based on a modified Epipolar Constraint that determines the trailers rotation and translation based on up to three parameters comprising a yaw angle and/or a pitch angle and/or a roll angle of the trailer.

According to an exemplary embodiment of the present invention, the determined trailer pose is calculated by optimizing one angle of yaw, pitch and roll to minimize an error metric, by solving the corresponding polynomial equation.

According to an exemplary embodiment of the present invention, the error metric is one of the Sampson Distance, the Algebraic distance, or the reprojection error.

According to an exemplary embodiment of the present invention, the processor is configured to determine at least two feature correspondences between the reference image and the current image for calculating the vehicle trailer pose.

According to an exemplary embodiment of the present invention, the processor is configured to calculate the vehicle trailer pose comprising a yaw angle and/or a pitch angle and/or a roll angle of the trailer.

According to an exemplary embodiment of the present invention, the processor is configured to calculate the vehicle trailer pose comprising a set of angles of a set of principal axis of the trailer.

According to an exemplary embodiment of the present invention, the device is configured to provide an intrinsic and/or extrinsic calibration of the camera determining the at least one intrinsic parameter of the camera and/or the at least one extrinsic parameter of the camera.

According to an exemplary embodiment of the present invention, the device is configured to provide the tow hitch position of the trailer.

According to an exemplary embodiment of the present invention, the memory is configured to store the tow hitch position of the trailer.

The method could also be adapter to calculate the angle between any articulated parts of a vehicle, such as between the front and rear parts of an articulated digger/excavator, or to calculate the pose of two attached trailers, one at the front and one at the rear, in which case a forward and a rear facing camera may be necessary.

The algorithm could also be extended to estimate or refine the extrinsics, intrinsics and tow ball position. For instance, a non-linear least squares solver could be applied to the reprojection error, given the extrinsics, intrinsics, tow bar position and trailer pose as inputs.

By minimizing this reprojection error, the algorithm could estimate or refine the extrinsics, intrinsics and tow ball position in addition to the trailer pose.

A computer program performing the method of the present invention may be stored on a computer-readable medium. A computer-readable medium may be a floppy disk, a hard disk, a CD, a DVD, an USB (Universal Serial Bus) storage device, a RAM (Random Access Memory), a ROM (Read Only Memory) or an EPROM (Erasable Programmable Read Only Memory).

A computer-readable medium may also be a data communication network, for example the Internet, which allows downloading a program code.

The methods, systems, and devices described herein may be implemented as software in a Digital Signal Processor, DSP, in a micro-controller or in any other side-processor or as a hardware circuit within an application specific integrated circuit, ASIC, CPLD or FPGA.

The present invention can be implemented in digital electronic circuitry or in computer hardware, firmware, software, or in combinations thereof, for instance in available hardware or in new hardware dedicated for processing the methods described herein.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

A more complete appreciation of the invention and the attendant advantages thereof will be clearly understood by reference to the following schematic drawings, which are not to scale, wherein.

DETAILED DESCRIPTION OF EMBODIMENTS

The following description of the preferred embodiment(s) is merely exemplary in nature and is in no way intended to limit the invention, its application, or uses.

The illustration in the drawings is purely schematic and does not intend to provide scaling relations or size information. In different drawings, similar or identical elements are provided with the same reference numerals.

Generally, identical parts, units, entities or steps are provided with the same reference symbols in the description.

The term "trailer" as used by the present invention may refer to any unpowered vehicle towed by a powered.

The term "pose" as used by the present invention may refer to any relative or absolute measure for defining any position, location or angle of an object.

The term "pose estimation" as used by the present invention may refer to the problem of determining the relative position and orientation between an object and an observer, the observer in this context being a camera for example.

Figure 1:
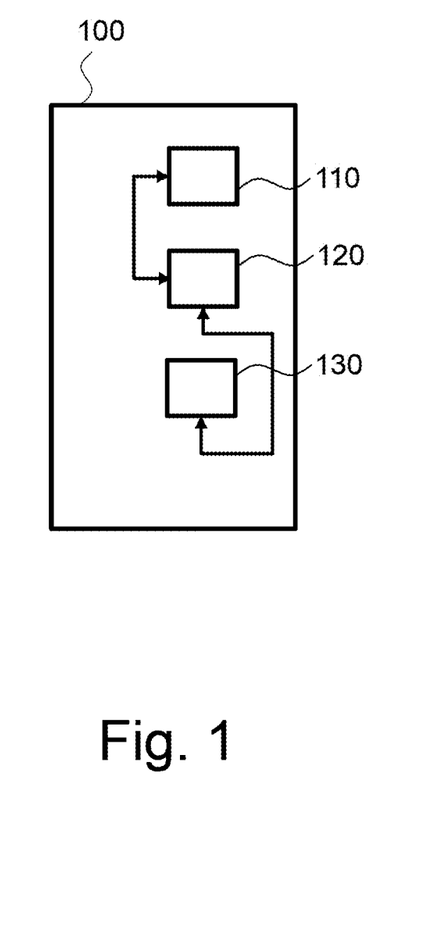
FIG. 1 shows a schematic diagram for a device for calculating a vehicle trailer pose using a camera according to an exemplary embodiment of the present invention.

FIG. 1 shows a schematic diagram for a device for calculating a vehicle trailer pose using a camera according to an exemplary embodiment of the present invention.

The device 100 for calculating a vehicle trailer pose using a camera comprises a camera 110, a memory 120, and a processor 130.

The camera 110 is arranged offset from a tow bar position of the vehicle.

The memory 120 is configured to provide data on at least one intrinsic parameter of the camera; on at least one extrinsic parameter of the camera; on at least one predefined tow bar position; on at least one predefined reference image representing the vehicle trailer at a predefined position.

The camera 110 is configured to capture a current image showing the trailer at a pose to be determined.

The processor 130 is configured to provide image analysis and determine at least one feature correspondence between the reference image and the current image and calculate the vehicle trailer pose based on the determined correspondence.

Figure 2:
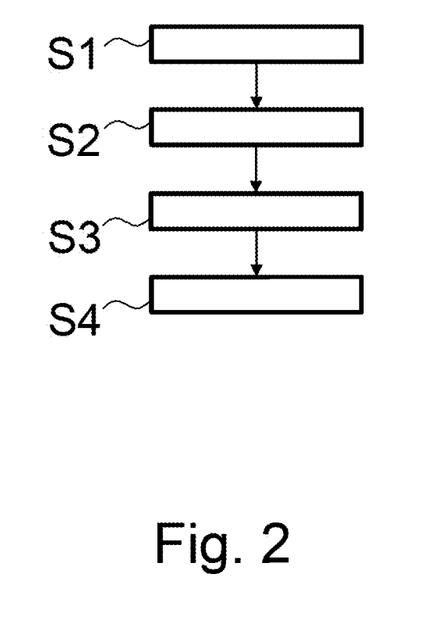
FIG. 2 shows a schematic flowchart diagram for a method for calculating a vehicle trailer pose using a camera according to an exemplary embodiment of the present invention.

FIG. 2 shows a schematic flowchart diagram for a method for calculating a vehicle trailer pose using a camera according to an exemplary embodiment of the present invention.

The method for calculating a vehicle trailer pose using a camera comprises the following steps of:

As a first step of the method, providing S1 a camera 110, which is arranged offset from a tow bar position of the vehicle, is performed.

As a second step of the method, providing S2, by means of a memory 120, data on:
i) at least one intrinsic parameter of the camera;
ii) at least one extrinsic parameter of the camera;
iii) at least one predefined tow bar position;
iv) at least one predefined reference image representing the vehicle trailer at a predefined position is performed.

As a third step of the method, capturing S3 a current image showing the trailer at a pose to be determined by means of the camera 110 is performed.

As a fourth step of the method, providing S4 image analysis and determining at least one feature correspondence between the reference image and the current image and calculating the vehicle trailer pose based on the determined correspondence by means of a processor 130, is performed.

Figure 3:
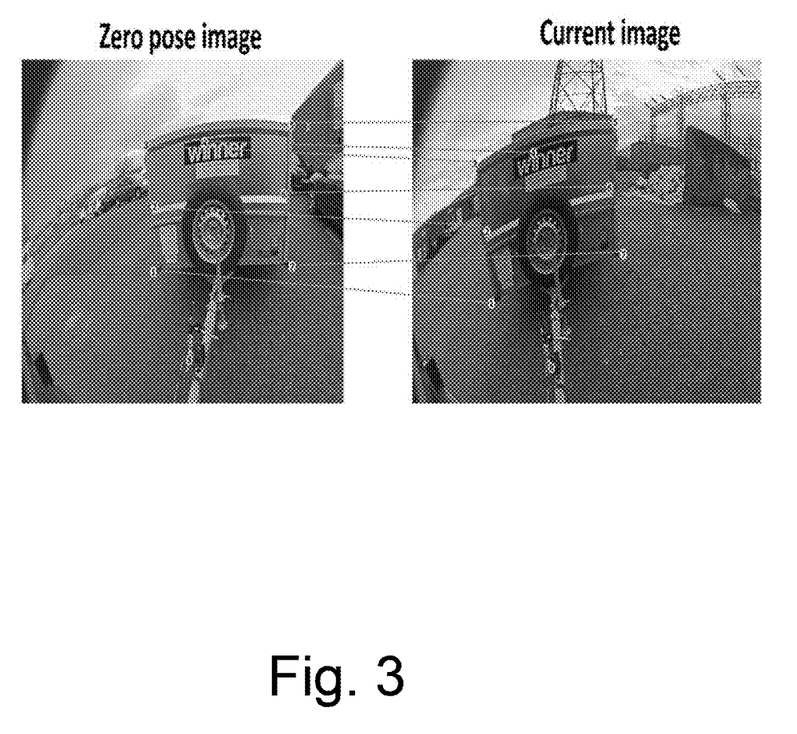
FIG. 3 shows a schematic diagram of a given a set of feature correspondences between features in a current image in which the trailer has unknown rotation and features in a zero pose image in which the trailer has zero rotation according to an exemplary embodiment of the present invention.

FIG. 3 shows a schematic diagram of a given a set of feature correspondences between features in a current image in which the trailer has unknown rotation and features in a zero pose image in which the trailer has zero rotation according to an exemplary embodiment of the present invention.

Firstly, RANdom SAmple Consensus (RANSAC) is applied to estimate an initial rotation hypothesis and inliers of correspondences, the initial rotation hypothesis is then refined iteratively using all inliers of correspondences for the final rotation estimation.

RANSAC is a data-driven method to estimate parameters of a mathematical model from a set of observed data which contains outliers. It first generates hypotheses and then evaluates hypotheses by random sampling data, the hypothesis with the best RANSAC score is selected and refined using all inliers.

In order to utilize rotation estimation in previous frames, additional hypotheses from previous frames can also be evaluated and compared with hypotheses generated in a current frame, and it sometimes can improve quality of hypotheses generated.

In some situations, there may be too many outliers for the RANSAC process to converge to the correct solution. If this is likely to occur, for instance, because the camera has a very wide field of view, then other methods can be used to reduce the number of outliers. For example, a region of interest could be used in the image to restrict where the algorithm searches for image features.

Alternatively, the algorithm could search for image features in areas of the image in which the trailer is expected to appear. This expected location of the trailer could be predicted by using a dynamic model of the trailers motion together with speed and steering data from the car to model the trailers movements.

According to an exemplary embodiment of the present invention, the dynamic model of the trailer could then be iteratively updated with estimates of the trailers pose.

According to an exemplary embodiment of the present invention, in the first stage of hypothesis generation, given a point correspondence m in the reference frame with zero rotation and z in the current frame, Epipolar Constraint applies:

$$z^T E m = 0 \tag{1}$$

Where E is the Essential Matrix. This matrix encapsulates the rotation and translation of the camera between the current frame and the reference image.

$$E = [P]_x R - R[P]_x \tag{2}$$

P is the 3-vector of the known tow bar position
$[P]_x$ is the skew-symmetric matrix of P
R is the 3×3 rotation matrix representing the unknown rotation (yaw, pitch and roll) of the trailer.
The unknown rotation can be parameterized as:

$$R = 2(q_c q_c^T + q_r [q_c]_x) + (2q_r^2 - 1)I, \tag{3}$$

where
I is the identity matrix.

$$q \text{ is a quaternion:} q = [q_r, q_C] \tag{4}$$

$q_r$ is the real part of a quaternion and,
$q_C = [q_x, q_y, q_z]^T$ is the imaginary part of a quaternion.
Now the Epipolar Constraint can be simplified to $$\bar{q}^T A \bar{q} + b^T \bar{q} = 0$$

where:

$\bar{q} = [\bar{q}_x \ \bar{q}_y \ \bar{q}_z]^T$ where: $\bar{q}_x = q_x/q_r$, $\bar{q}_y = q_y/q_r$ and $\bar{q}_z = q_z/q_r$ $A = \tilde{z} m_T - z \bar{m}_T$ $b^T = z^T [\tilde{m}]_x - \tilde{z}^T [m]_x$ where: $\tilde{z}^T = z^T [P]_x$ and $\tilde{m} = [P]_x m$ Given two random point correspondences in the reference image with zero rotation and current image with unknown rotation $m_i, z_i, m_j, z_j$, two constraints can be obtained:

$$\begin{cases} \bar{q}^T A_i \bar{q} + b_i^T \bar{q} = 0 \\ \bar{q}^T A_j \bar{q} + b_j^T \bar{q} = 0 \end{cases}$$

There are three unknowns in above two equations, so a third constraint is needed and this leads to two algorithms for hypotheses generation:
Two-point algorithm for estimating Pitch and Yaw, using a zero roll assumption
Three-point algorithm for estimating Pitch Yaw and Roll.
The third constraint in the two-point algorithm, $\bar{q}_x = -\bar{q}_y \bar{q}_z$, is from the zero roll assumption.
The third constraint in the three-point algorithm, $\bar{q}^T A_k \bar{q} + b_k^T \bar{q} = 0$ is from the third point correspondence $(m_k, z_k)$.
Now the system of three equations with three unknown variables can be efficiently solved by a variety of numerical or analytical methods.

According to an exemplary embodiment of the present invention, once $\bar{q}$ has been calculated, it can be converted back to the full quaternion $$q = [q_r \ q_r\bar{q}_x \ q_r\bar{q}_y \ q_r\bar{q}_z]^T$$

where $q_r = \cos[2\tan^{-1}((\bar{q}_x^2 + \bar{q}_y^2 + \bar{q}_z^2)]$

There are usually multiple solutions of quaternions, which are then checked to see if they are real and non-zero solutions or hypotheses. Valid hypotheses are evaluated for all point correspondences and a score based on number of inliers and sum of Sampson distance are computed for each hypothesis.

The Sampson distance is given by $$\frac{(z^T E m)^2}{\|Em\|^2 + \|E^T z\|^2}.$$

According to an exemplary embodiment of the present invention, the best rotation hypothesis with the most number of inliers or least Sampson distance (or a combination of both) is selected as the initial rotation estimation.

According to an exemplary embodiment of the present invention, the initial estimated rotation in terms of yaw, pitch and roll is then refined iteratively to minimize the sum of the Sampson distances of all the inliers.

The yaw is refined by fixing pitch and roll.
The pitch is refined by fixing yaw and roll.
The roll is refined by fixing yaw and pitch.

According to an exemplary embodiment of the present invention, by updating only one angle and fixing the other two angles, the sum of Sampson distances can be approximated by:

$$J = \frac{c_{num}^T x}{c_{denom}^T x}$$

Where:

$$x = [1 \ x \ x^2 \ x^3 \ x^4]^T$$
$$x = \tan\frac{\theta}{2}$$

$\theta$ is either yaw, pitch or roll.

According to an exemplary embodiment of the present invention, this can be optimized by setting its derivative to zero and solving a sixth order equation. Once the rotation estimation converges or the maximum number of iterations is reached, a final refined rotation is obtained.

According to an exemplary embodiment of the present invention, other suitable error measures and minimization methods could be used to find the optimal trailer pose instead of the Sampson distance. For example, a reprojection error could be used as a measure of error, together with a non-linear least squares solver.

According to an exemplary embodiment of the present invention, the equations above are all based on the camera co-ordinate system. This is widely used for modelling camera projections in the field of computer vision. In this co-ordinate system the origin is at the cameras centre of projection and the z axis points along the cameras optical centre away from the camera. The x and y axis therefore correspond to image co-ordinates, where the x axis points to the right and the y direction points downwards when looking at the image.

Figure 4:
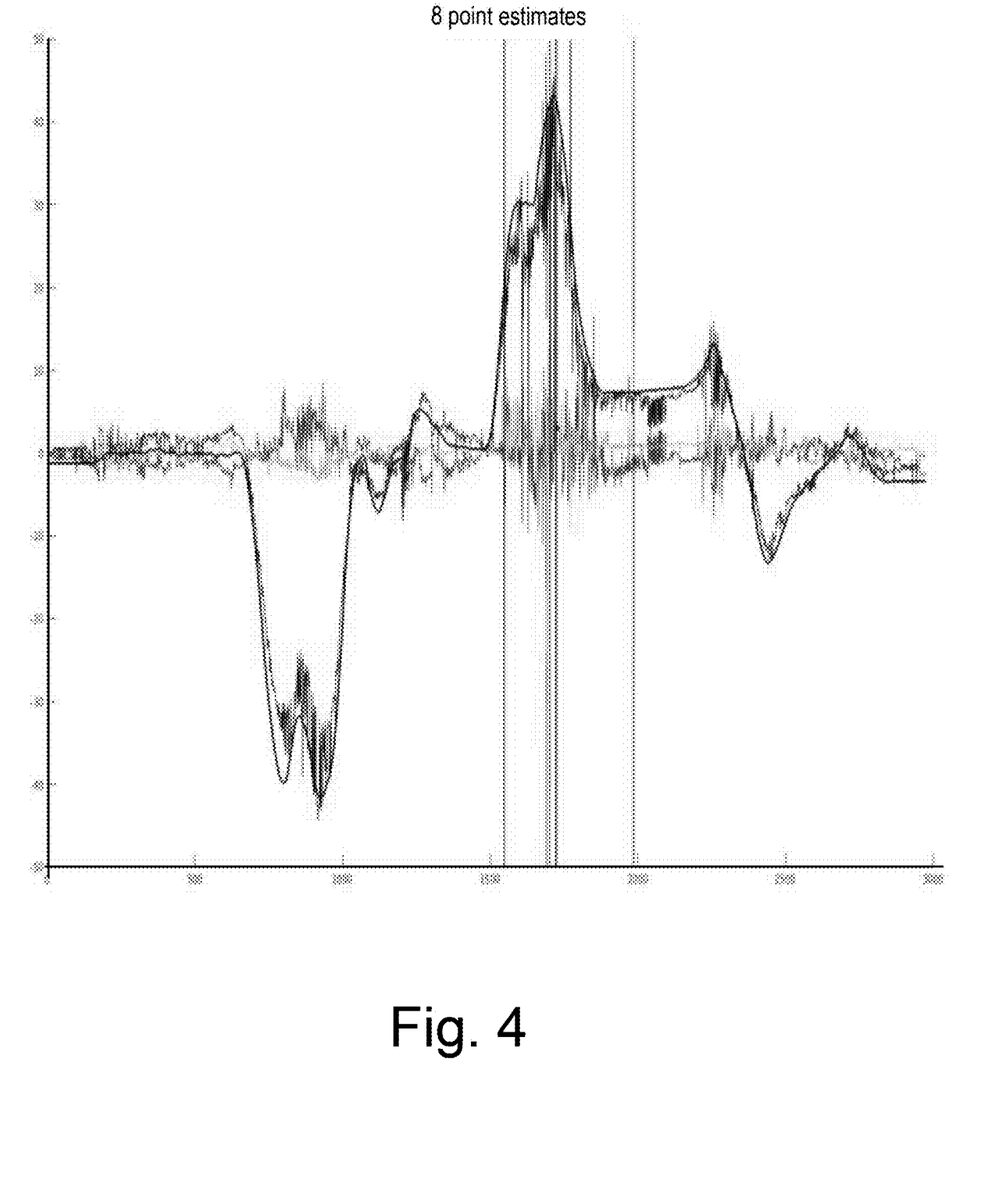
FIG. 4 shows a schematic diagram of a ground truth (the solid line curve, with noise being the smaller curves shown), Results from Essential Matrix calculation (dots) according to the prior art. X-axis represents the image frame being processed, Y-axis represents the angle of the trailer.

FIG. 4 shows a schematic diagram of a ground truth (line) and results from Essential Matrix calculation (dots) according to the prior art.

Figure 5:
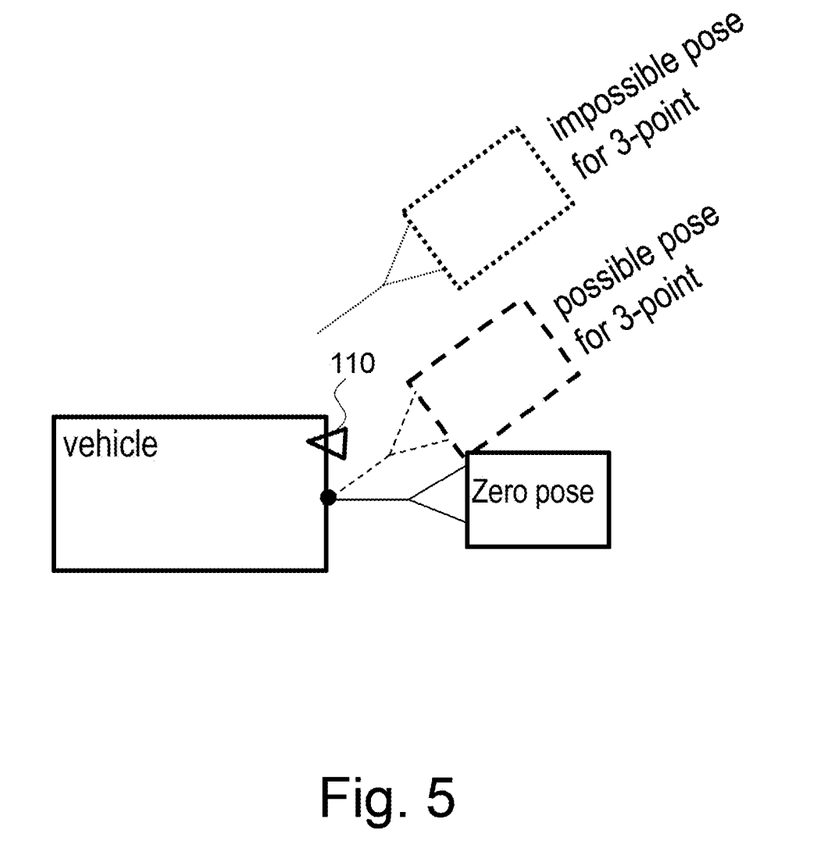
FIG. 5 shows an example of possible trailer pose positions for 2 and 3 point solvers according to an exemplary embodiment of the present invention.

FIG. 5 shows an example of possible trailer pose positions for 2 and 3 point solvers according to an exemplary embodiment of the present invention.

Figure 6:
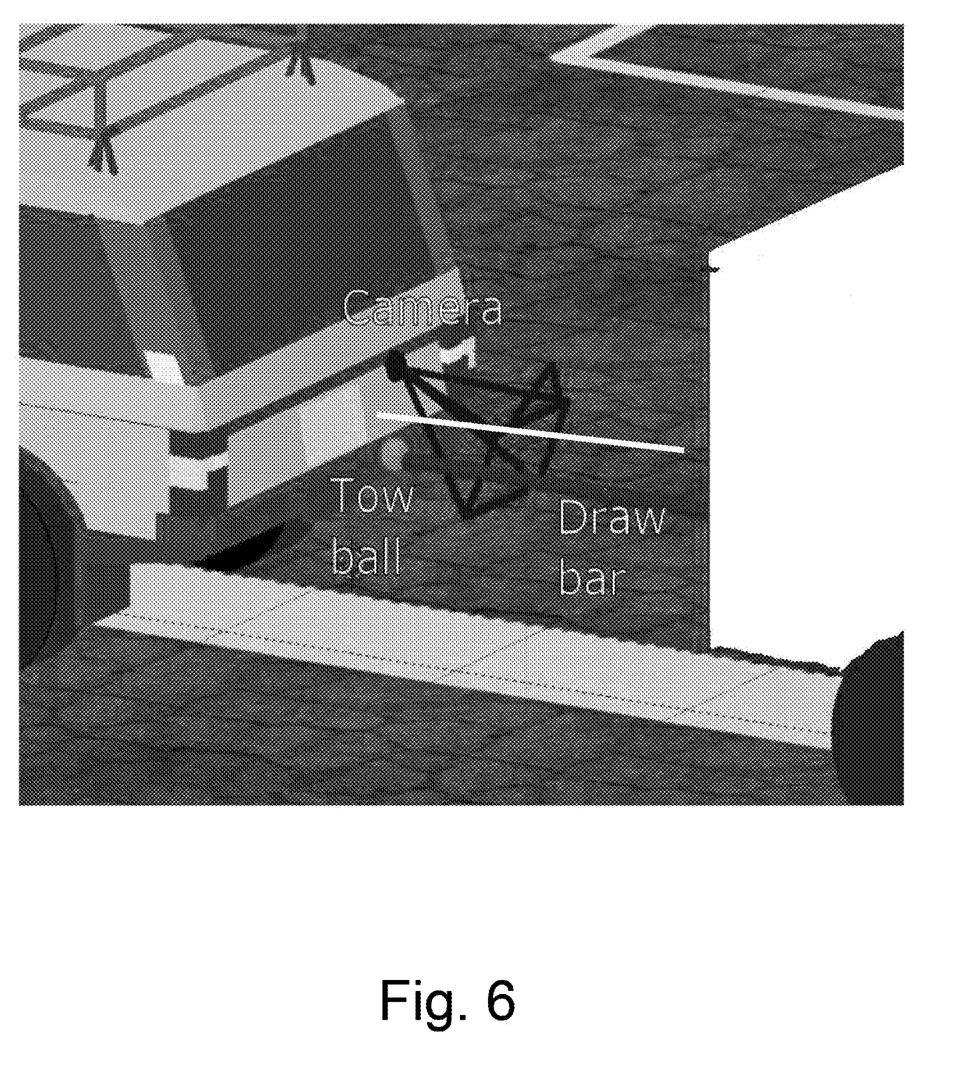
FIG. 6 shows an example of possible a rear facing camera arrangement according to an exemplary embodiment of the present invention.

FIG. 6 shows an example of possible a rear facing camera arrangement according to an exemplary embodiment of the present invention.

Figure 7:
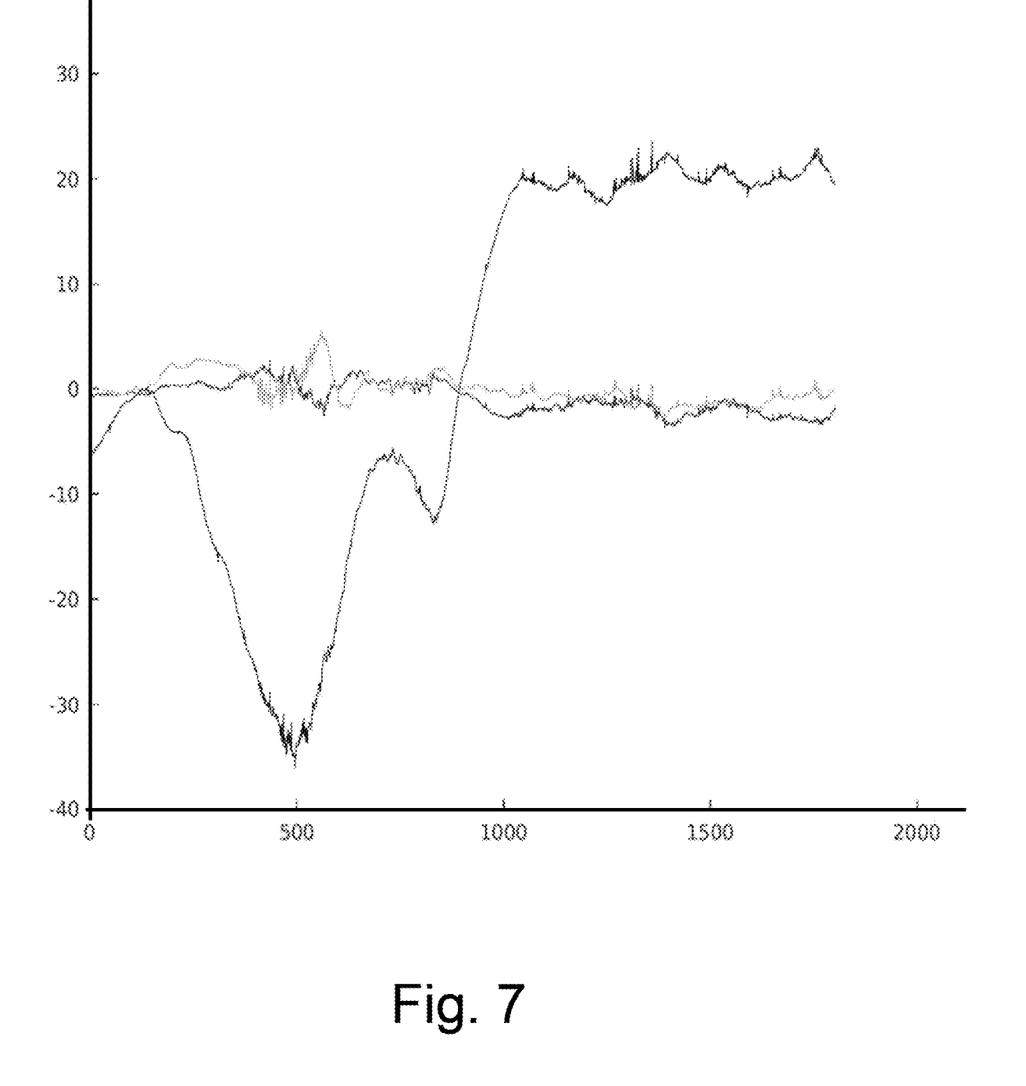
FIG. 7 shows an example of Noisy Essential Matrix method calculations according to the prior art, X-axis represents the image frame being processed, Y-axis represents the angle of the trailer (with noise being the smaller curves shown)

FIG. 7 shows an example of the 3-point method calculations according to an exemplary embodiment of the present invention.

Figure 8:
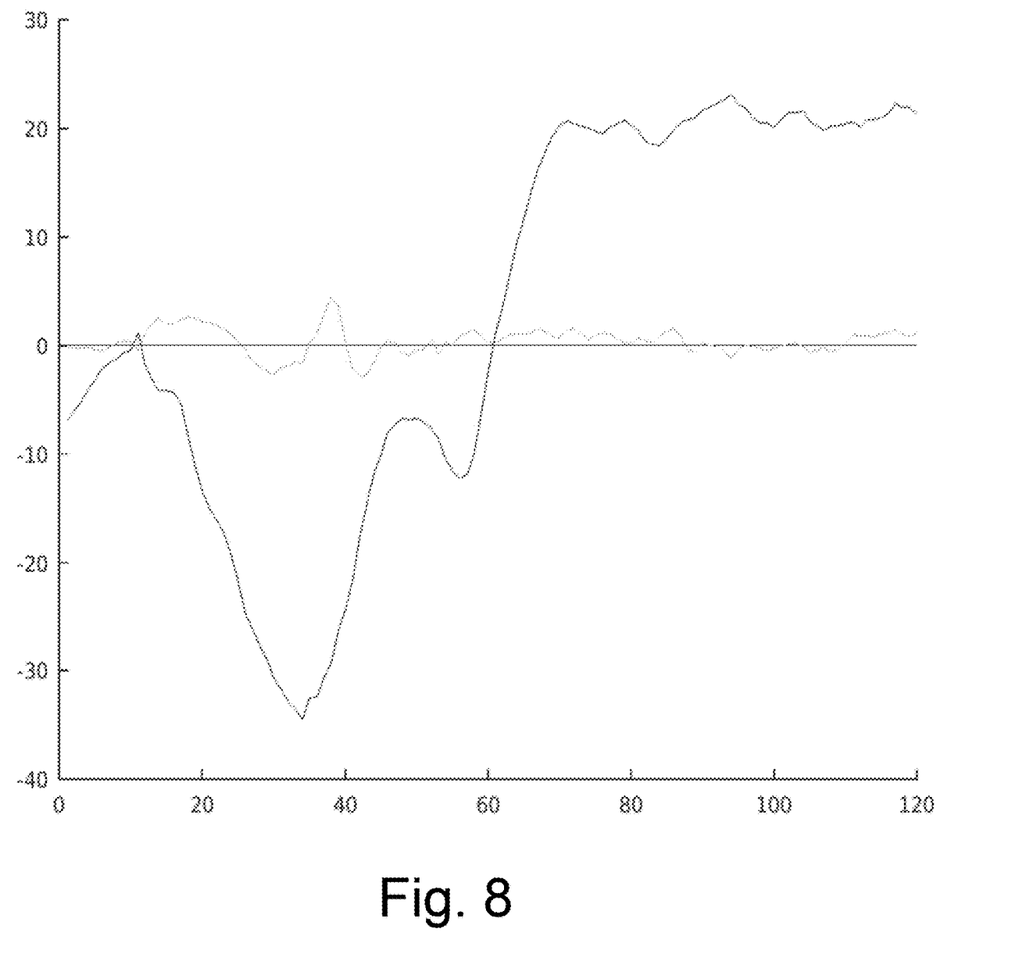
FIG. 8 shows an example of Smooth 2-point method calculations with roll angle assumed to be zero according to an exemplary embodiment of the present invention, X-axis represents the image frame being processed, Y-axis represents the angle of the trailer (with noise being the smaller curve(s) shown).

FIG. 8 shows an example of smoother 2-point method calculations, with roll assumed to be zero, according to an exemplary embodiment of the present invention.

It has to be noted that embodiments of the present invention are described with reference to different subject-matters. In particular, some embodiments are described with reference to method type claims, whereas other embodiments are described with reference to the device type claims.

However, a person skilled in the art will gather from the above and the foregoing description that, unless otherwise notified, in addition to any combination of features belonging to one type of the subject-matter also any combination between features relating to different subject-matters is considered to be disclosed with this application.

However, all features can be combined providing synergetic effects that are more than the simple summation of these features.

While the invention has been illustrated and described in detail in the drawings and foregoing description, such illustration and description are to be considered illustrative or exemplary and not restrictive; the present invention is not limited to the disclosed embodiments.

Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. A single processor or controller or other unit may fulfill the functions of several items recited in the claims.

The mere fact that certain measures are recited in mutually different dependent claims does not indicate that a combination of these measures cannot be used to advantage. Any reference signs in the claims should not be considered as limiting the scope.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A device for calculating a trailer pose using a camera, the device comprising:
   a camera which is arranged offset from a tow bar position of a vehicle and which is configured to capture an image of the trailer;
   a memory which is configured to provide data, the data further comprising:
   at least one intrinsic parameter of the camera;
   at least one extrinsic parameter of the camera;
   at least one predefined tow bar position;

a first image taken from the camera showing the trailer at a first pose;

wherein the camera is configured to capture a second image showing the trailer at a pose to be determined;

a processor which is configured to provide image analysis and determine at least one feature correspondence between the first image and the second image and calculate a change in the trailer pose between a first pose of the first image and a second pose of the second image based on the determined correspondence, wherein the trailer pose is determined based on a modified Epipolar constraint that determines the rotation of the trailer and translation based on up to three parameters comprising at least one of a yaw angle, a pitch angle, or a roll angle of the trailer.

2. The device of claim 1, wherein the determined trailer pose is calculated by optimizing one angle of yaw, pitch and roll to minimize an error metric, by solving the corresponding polynomial equation.

3. The device of claim 2, the error metric being one selected from the group consisting of the Sampson Distance or the reprojection error.

4. The device of claim 1, wherein the processor is configured to determine at least two feature correspondences between the first image and the second image for calculating the change in the trailer pose.

5. The device of claim 1, wherein the processor is configured to calculate the change in the trailer pose comprising at least one of a yaw angle, a pitch angle, or a roll angle of the trailer.

6. The device of claim 1, wherein the processor is configured to calculate the change in the trailer pose comprising a set of angles of a set of principal axes of the trailer.

7. The device of claim 1, wherein the device is configured to use at least one of an intrinsic or extrinsic calibration of the camera for precisely calculating the change in the trailer pose based on the determined correspondence.

8. The device of claim 1, wherein the device is configured to provide the tow hitch position of the trailer.

9. A method for calculating a trailer pose using a camera, the method comprising the steps of:

providing a camera which is arranged offset from a tow bar position of the vehicle and which is configured to capture an image of the trailer;

providing, by means of a memory, data;

providing at least one intrinsic parameter of the camera being part of the data;

providing at least one extrinsic parameter of the camera being part of the data;

providing at least one predefined tow bar position being part of the data;

providing a first image taken from the camera showing the trailer at a first pose being part of the data;

capturing a second image showing the trailer at a second pose using the camera;

providing image analysis and determining a feature correspondence between the first image and the second image and calculating a change in the trailer pose between the first pose and the second pose based on the determined correspondence by means of a processor, determining the change in trailer pose between the first pose and the second pose based on an Epipolar constraint; and determining the trailer pose based on a modified Epipolar constraint that determines the trailer's rotation and translation based on up to three parameters comprising at least one of a yaw angle, a pitch angle, or a roll angle of the trailer.

10. The method of claim 9, further comprising the steps of calculating the determined trailer pose by optimizing one angle of yaw, pitch and roll to minimize an error metric, by solving the corresponding polynomial equation.

11. The method of claim 10, further comprising the steps of selecting the error metric from one of the group consisting of the Sampson Distance or the reprojection error.

12. The device of claim 1, wherein the data provided by the memory further comprises a plurality of images with each image taken from the camera showing the trailer at a distinct pose, wherein determining the at least one feature correspondence comprises determining the at least one feature correspondence between each image and the second image, wherein the processor selects an image from the plurality of images having the feature correspondence with a greatest distance, and wherein the first image is the selected image.

13. The method of claim 9, wherein the data further provides a plurality of images with each image taken from the camera showing the trailer at a distinct pose, wherein determining the feature correspondence comprises determining the feature correspondence between the second image and each image of the plurality of images, and the method further comprises selecting an image from the plurality of images having the feature correspondence associated with a greatest distance, wherein the first image is the selected image.

* * * * *